3,380,836
CORROSION INHIBITING PIGMENT
Herbert J. Robinson, Detroit, Mich., assignor, by mesne assignments, to Interchemical Corporation, New York, N.Y., a corporation of Ohio
No Drawing. Filed Aug. 13, 1965, Ser. No. 479,615
11 Claims. (Cl. 106—14)

ABSTRACT OF THE DISCLOSURE

A liquid corrosion inhibiting coating composition consisting of a mixture of a solvent and an organic film-forming resinous material incorporating therein a finely-particulated pigment of calcium metaborate dispersed as discrete particles substantially uniformly throughout the composition. The invention also relates to articles having a corrosion-resisting coating of the aforementioned type on at least a portion of the surfaces thereof.

---

The present invention relates to a method and composition for inhibiting corrosion of an article coated thereby, and more particularly to a method wherein calcium metaborate is employed as a corrosion inhibiting pigment along with a suitable film-forming vehicle.

One of the primary reasons for applying a coating composition to a metal substrate, particularly ferrous substrates, is to inhibit corrosion of the substrate. It is common practice to employ anti-corrosion pigments in coating compositions to increase the corrosion resistant effect of the applied film. In the past, the most widely used anti-corrosion pigments have been the chromate and lead compounds. These pigments have the disadvantage of being an irritant and toxic, respectively. Therefore, the amount of these pigments used in coating compositions has had to be kept at a low level, particularly where the composition is to be applied in an enclosed space. Additionally, prior art corrosion inhibiting pigments have generally been colored, such as red, green or yellow. These colors are not advantageous in preparing decorative paints because they limit the range of colors which may be formulated.

The present invention provides a method and composition which utilizes calcium metaborate pigment along with a suitable film-forming ingredient, a solvent and any other desired additives. The use of calcium metaborate results in excellent corrosion inhibition. Since calcium metaborate is colorless, it permits formulating coating compositions in a very wide range of colors. Calcium metaborate is preferred. However, the hydrous forms are liberal amounts.

The calcium metaborate is used in a finely divided particle state; the particles being in general less than three microns in diameter. The anhydrous form of calcium metaborate is preferred. However, the hydrous forms are also effective. For example, the hexahydrate, $$(Ca(BO_2)_2 — 6H_2O)$$

tetrahydrate, $(Ca(BO_2)_2 — 4H_2O)$ and dihydrate $$(Ca(BO_2)_2 — 2H_2O)$$

result in satisfactory anti-corrosion properties. The disadvantage of the hydrated forms is that when such materials are used in compositions wherein the applied film is cured by baking, the water of hydration is driven off during the baking step resulting in a bleached appearance of the final film. This bleaching is objectionable from the appearance standpoint.

The calcium metaborate may be prepared by any of a number of standard reactions. One method is to react borax, calcium hydroxide and calcium sulphate as follows:

$$Na_2O \cdot 2B_2O_3 + Ca(OH)_2 + CaSO_4$$
$$= 2CaO \cdot B_2O_3 + Na_2SO_4 + H_2O$$

Another method is to react borax, calcium hydroxide and calcium chloride as follows:

$$Na_2O \cdot 2B_2O_3 + Ca(OH)_2 + CaCl$$
$$= 2CaO \cdot B_2O_3 + 2NaCl + H_2O$$

Calcium metaborate is most effective when used in a coating composition having other pigments therein. Calcium metaborate is most effective in coating compositions having a total amount of pigments ranging from 15 to 60 percent by volume of the total nonvolatile solids and wherein the calcium metaborate is present in a range of from about 3 to 60 percent by volume of the pigment. The preferred range appears to be about 25 to 40 percent by volume of pigment with calcium metaborate forming from 10 to 40 percent by volume of the pigment. The anti-corrosion properties of calcium metaborate are useful in a wide variety of coating compositions incorporating various resinous film-forming materials, however, the following are preferred: phenolic resins, alkyd resins, urea resins, vinyl resins, polyurethane resins, melamine resins, allyl and unsaturated polyester resins, oleoresinous varnishes and epoxy resins. The following resinous film-forming materials may be employed: cellulose nitrate and acetate, acrylate resins, cellulose acetobutyrate, ethyl cellulose, polystyrene, vinyl acetals, cyclohexanone resins, chlorinated rubber, synthetic rubber, polyethylene, polyfluoroethylene and silicones. The invention is particularly useful in coating compositions incorporating oil-modified alkyd resins and epoxy resins.

The alkyd resin of particular interest in the present invention is the standard resin prepared by the union of a polybasic acid or anhydride with a polyhydric alcohol such as a glycol or glycerine. The polybasic acid may be one of the well-known carboxylic acids used in the preparation of alkyd resins such as phthalic anhydride, isophthalic acid, sebacic acid, maleic acid, azelaic acid and succinic acid. Other acids which may be used on a molar basis as a partial replacement are fumaric acid and adipic. Phthalic anhydride is the preferred acid for use in forming the alkyd resin. Suitable polyhydric alcohols are glycerine, ethylene glycol and trimethylolpropane (2,2-dihydroxymethyl-1-butanol). A preferred alcohol is trimethylolethane (2-hydroxymethyl-2-methyl-1,3-propanediol).

The alkyd resin is preferably modified by a monocarboxylic acid. This modification produces desirable qualities in the resin, particularly when it is used as a film-forming constituent in a coating composition. The monocarboxylic acid is preferably admixed during the formation of the resin. The monocarboxylic acid may be used as such or it may be incorporated as a natural oil. Suitable modifying agents of this class are, for example, linseed fatty acids, soya fatty acids, coconut fatty acids, conjugated linseed acids, pelargonic acid, tung oil, linseed oil, castor oil fatty acids, dehydrated castor oil fatty acids, tall oil fatty acids and linoleic acid. Benzoic or para-tertiarybutylbenzoic acid may be used as a partial replacement for phthalic acid and a monocarboxylic acid. The alkyd resin may be prepared in the ordinary manner by the union of the polybasic acid or anhydride with the polyhydric alcohol comprising the admixture of the acid and alcohol under conditions of heat whereby the acid and alcohol will react to form an alkyd resin.

The epoxy resins suitable in this invention are based on ethylene oxide or its homologs or its derivative. The repeating unit of the resins probably has the structure:

Such compounds can be made by condensation of polyfunctional halohydrin or glyceroldichlorohydrin and polyhydric compounds, particularly the dihydric phenols such as bisphenol A. The epoxide equivalent of the epoxy resins is preferably in the range of from 140–2000. Commercially available epoxy resins (epichlorohydrin bisphenol resins which may be termed glycidyl polyethers of a dihydric phenol) suitable for use in the present invention are sold by the Shell Chemical Corporation, New York, N.Y. The epoxy resins sold by the Shell Chemical corporation indicated hereinafter in the examples are postulated to have the following structure:

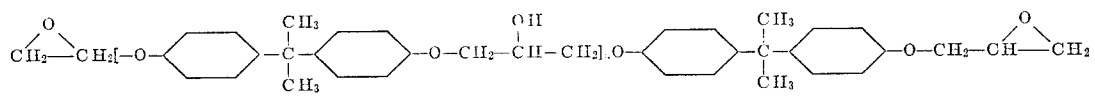

Examples of some coating compositions prepared according to the present invention are as follows:

EXAMPLE I

| | Parts by weight |
|---|---|
| Lamp black | 83 |
| Barium sulphate | 1214 |
| $Ca(BO_2)_2$ (anhydrous) | 330 |
| Soya lecithin | 16 |
| Shell Epon 1004 (product of Shell Chemical Corporation) Dehydrated castor oil epoxy ester (50% non-volatile solids) | 1594 |
| Toluol | 2179 |

This material is useful as a primer composition for metal. It is cured by baking and has excellent corrosion resistance when applied over oily, cold rolled steel at film thicknesses varying from 0.5 mil to 1.5 mils when baked for 45 minutes at 285° F. This is an excellent primer for use on automobile parts which are subject to a high rate of corrosion, as for example, the inside surface of the rocker panels on an automobile.

EXAMPLE II

| | Pounds |
|---|---|
| Iron oxide | 123.0 |
| Lamp black | 2.0 |
| Aluminum silicate | 100.0 |
| Barytes (barium sulphate) | 136.0 |
| Bentone #34 (product of Baroid Division, National Lead Co.) | 2.7 |
| Anhydrous calcium metaborate | 40.0 |
| Soya lecithin | 8.0 |
| Epoxy ester Shell Epon 1004 esterified with dehydrated castor oil fatty acid (39.0%) (50% non-volatile) | 293.0 |
| Xylol | 210.0 |
| Solvesso 100 (product of Esso Standard Oil Co.) | 148.0 |
| Lead naphthenate | 4.5 |
| Manganese naphthenate | 1.3 |
| Cobalt naphthenate | 1.3 |
| Guiacol | 1.3 |

This material is useful as a corrosion inhibitive primer composition for use under enamel topcoats. It has excellent corrosion inhibition over both phosphated cold rolled steel and phosphated galvanized steel.

EXAMPLE III

| | Parts by weight |
|---|---|
| Iron oxide | 83 |
| Magnesium silicate | 81 |
| Mica | 29 |
| Bentone #38 | 2.5 |
| Calcium metaborate (anhydrous) | 107 |
| Raw linseed oil | 77 |
| Linseed soya alkyd (50% non-volatile, 51% oil, 80% soya, 20% linseed) | 103 |

This material has been found to be an excellent air-drying primer composition and is very useful in outdoor applications, such as on steel bridge structures where maximum corrosion resistance is needed. This material was applied to cold rolled steel, air dried and then subjected to a 5 percent salt spray for twelve days. As the result of this test, it was found that the corrosion resistance was good. The corrosion resistance was equivalent to the same formula containing an equal volume of red lead, a conventional anti-corrosion pigment.

EXAMPLE IV

| | Parts by weight |
|---|---|
| Titanium dioxide | 38 |
| Zinc oxide | 48 |
| Raw sienna | 13 |
| Magnesium silicate | 38 |
| Aluminum distearate | 3 |
| Magnesium silicate | 17 |
| Iron oxide | 16 |
| Anhydrous calcium metaborate | 77 |
| Soya alkyd (50% non-volatile, 65% soya) | 173 |

This material is an air-drying corrosion resistant primer suitable for outdoor applications to steel structures. Tests of this material indicate that when applied over cold rolled steel and subjected to a 5 percent salt spray for nine days resulted in corrosion resistance superior to a similar primer containing zinc chromate, a well-known anti-corrosion resistant pigment.

EXAMPLE V

| | Parts by weight |
|---|---|
| Carbon black | 10 |
| Bentone #38 | 4 |
| Anhydrous calcium metaborate | 36 |
| Alkali, refined linseed oil | 24 |
| Soya alkyd (50% non-volatile, 58% oil) | 236 |

This material is a black corrosion-resistant enamel. When tested against a similar composition containing basic lead silico chromate as a corrosion-resistant pigment, it was found to result in improved corrosion resistance. The enamel is designed to give fair corrosion resistance when used directly over metal.

EXAMPLE VI

| | Parts by weight |
|---|---|
| Titanium dioxide | 111 |
| Lamp black | 2 |
| Polyamide resin, Versamid 415 (product of General Mills, Inc.) | 191 |
| Magnesium silicate | 131 |
| Shell Epon 1007 epoxy resin (56.5% non-volatile) | 436 |
| Anhydrous calcium metaborate | 15 |

This material is a light gray epoxy enamel. It has been found to be particularly useful in areas where solvent and chemical resistance are required. Resistance of this material to a 5 percent salt spray solution was found to be noticeably better than the same formula without anhydrous calcium metaborate.

Direct tests of compositions similar to the above were made of compositions in which calcium metaborate was substituted for standard anti-corrosion resistant pigment. The following are these test results:

EXAMPLE VII

| | Parts by Weight | |
|---|---|---|
| Red lead | 358 | None |
| Iron oxide | 83 | 83 |
| Magnesium silicate | 81 | 81 |
| Mica | 29 | 29 |
| Bentone #38 | 2.5 | 2.5 |
| Anhydrous calcium metaborate | None | 107 |
| Raw linseed oil | 77 | 77 |
| Linseed, soya alkyd (50% non-volatile, 50% oil, 80% soya, 20% linseed) | 103 | 103 |

This material is an air-drying coating composition for use on steel structures requiring maximum corrosion resistance. In tests conducted, the material without the red lead was found to be equal to the material with the red lead after twelve days in a 5 percent salt spray test.

EXAMPLE VIII

| | Parts by Weight | |
|---|---|---|
| Polyurethane resins, Spenkel F-77-60MS (product of Spencer Kellogg & Sons, Inc.) | 325 | 325 |
| Iron oxide | 94 | 89 |
| Iron oxide | 94 | 89 |
| Magnesium silicate | 97 | 92 |
| Anhydrous calcium metaborate | None | 10 |

This is a urethane varnish material. It is designed as a primer coating composition. This material showed excellent results after being subjected for nine days to a 5 percent salt spray corrosion test.

EXAMPLE IX

| | Parts by Weight | |
|---|---|---|
| Zinc chromate | 135 | None |
| Titanium dioxide | 38 | 38 |
| Zinc oxide | 48 | 48 |
| Raw sienna | 13 | 13 |
| Magnesium silicate | 38 | 38 |
| Aluminum distearate | 3 | 3 |
| Magnesium silicate | None | 17 |
| Iron oxide | None | 16 |
| Anhydrous calcium metaborate | None | 77 |
| Reichhold P-296 Becksosol (product of Reichhold Chemicals, Inc.) Soya alkyd (50% non-volatile) | 173 | 173 |

This material is designed as an air-drying primer for use on steel where good corrosion resistance is desired. The zinc chromate is a standard anti-corrosion resistant pigment for this type of composition. In replacing the zinc chromate with calcium metaborate, the total volume of pigment was made up with the magnesium silicate and iron oxide in order to result in the least effect on the comparative testing for corrosion resistance. The material with the calcium metaborate was subjected to a 5 percent salt spray test for nine days and was found to have corrosion resistance equivalent to that of material with the zinc chromate.

EXAMPLE X

| | Parts by Weight | |
|---|---|---|
| Anhydrous calcium metaborate | None | 36 |
| Carbon black | 10 | 10 |
| Bentone #38 | 4 | 4 |
| Basic lead silica chromate | 25 | None |
| Alkali, refined linseed oil | 24 | 24 |
| Soya alkyd (50% non-volatile, 58% oil) | 236 | 236 |

This is an enamel designed for metals requiring fair corrosion resistance and the prevention of rusting. The basic lead silica chromate is provided in the control composition as an inhibiting pigment. The composition with the calcium metaborate was found to be an improvement over the control composition. The composition containing calcium metaborate passed a four-day 5 percent salt spray test. The conventional formula failed at the end of two days in the same test.

EXAMPLE XI

| | Parts by Weight | |
|---|---|---|
| Lamp black | 2 | 2 |
| Titanium dioxide | 63 | 63 |
| Basic lead silica chromate | 13 | None |
| Bentone #38 | 2 | 2 |
| Calcium carbonate | 23 | 23 |
| Soya alkyd resin (50% non-volatile, 50% oil) | 251 | 251 |
| Anhydrous calcium metaborate | None | 15 |
| Alkali, refined linseed oil | 24 | 24 |

This material is a gray enamel designed for application to steel structures as a primer-coating composition. The control composition incorporates basic lead silica chromate as the corrosion inhibiting pigment. The control composition failed after two days of a 5 percent salt spray test. The formula containing anhydrous calcium metaborate withstood the test for four days without failure.

EXAMPLE XII

| | Parts by Weight | |
|---|---|---|
| Titanium dioxide | 111 | 111 |
| Lamp black | 2 | 2 |
| Polyamide (Versamid 415) | 191 | 191 |
| Magnesium silicate | 131 | 131 |
| Shell Epon 1007 epoxy resin (56.5% non-volatile) | 436 | 436 |
| Anhydrous calcium metaborate | None | 15 |

This material is a light gray enamel useful on metals. Both compositions withstood a 5 percent salt spray test reasonably well. Both compositions began to fail after 28 days of the salt spray test, but the composition containing calcium metaborate had better anti-corrosion properties.

EXAMPLE XIII

| | Parts by Weight | |
|---|---|---|
| Iron oxide | 24.4 | 36.6 |
| Anhydrous calcium metaborate | 12.2 | None |
| Magnesium silicate | 12.2 | 12.2 |
| Litharge | .49 | .49 |
| Oleoresinous varnish 50% N.V., 25 gal. tung oil/phenolic | 41.50 | 41.50 |
| Mineral spirits | 11.02 | 11.02 |
| Xylene | 4.40 | 4.40 |
| Cobalt naphthenate | .17 | .17 |
| Manganese naphthenate | .17 | .17 |
| Antiskin (methyl ethyl ketoxime) | .44 | .44 |

The above oleoresinous varnish primer containing calcium metaborate had good corrosion resistance when applied over either cold rolled steel or bonderized cold rolled steel. The corrosion resistance was noticeably poorer without calcium metaborate.

It will thus be seen that there has been provided by this invention a method and means in which the various objects hereinabove set forth, together with many thoroughly practical advantages, are successfully achieved. While the preferred embodiments of the invention have been clearly shown and described, it is to be understood that the same is susceptible to modification, variation and change without departing from the spirit thereof or the appended claims.

What is claimed is:

1. A liquid corrosion inhibiting coating composition consisting essentially of a mixture of a solvent and an organic resinous film-forming vehicle, and a pigment comprising discrete particles of calcium metaborate in an amount effective to inhibit corrosion dispersed throughout said composition.

2. The coating composition as defined in claim 1, wherein said pigment is present in an amount of from about 15% to about 60% by volume of said vehicle.

3. The coating composition as defined in claim 1, wherein said calcium metaborate comprises from about 3% to about 60% by volume of the total pigment present.

4. The coating composition as defined in claim 1, wherein said pigment is present in an amount of from about 25% to about 40% by volume of the total non-volatile solids in said mixture.

5. The coating composition as defined in claim 4, wherein said calcium metaborate is present in an amount of from about 10% to about 40% by volume of the total pigment present.

6. The coating composition as defined in claim 1, wherein said organic resinous film-forming vehicle is selected from the group consisting of phenolic resins, vinyl resins, polyurethane resins, epoxy resins, oleoresinous varnishes, cellulose resins, cyclohexanone resins, polyester resins and synthetic rubbers.

7. The coating composition as defined in claim 5, wherein said organic resinous film-forming vehicle consists of an oil-modified alkyd resin.

8. The coating composition as defined in claim 5, wherein said organic resinous film-forming vehicle consists of a polyurethane resin.

9. The coating composition as defined in claim 5, wherein said organic resinous film-forming vehicle consists of an epoxy resin.

10. The coating composition as defined in claim 5, wherein said organic resinous film-forming vehicle consists of an oleoresinous varnish.

11. An article having a coating thereon produced from the composition as defined in claim 1.

References Cited
UNITED STATES PATENTS

| | | | |
|---|---|---|---|
| 2,430,589 | 11/1947 | Sloan | 106—14 X |
| 2,978,434 | 4/1961 | Atwood et al. | 106—14 X |
| 3,032,392 | 5/1962 | Nies et al. | 23—59 |
| 3,287,142 | 11/1966 | Russell | 106—14 |

JAMES A. SEIDLECK, *Primary Examiner.*

L. B. HAYES, *Assistant Examiner.*

UNITED STATES PATENT OFFICE
CERTIFICATE OF CORRECTION

Patent No. 3,380,836                          April 30, 1968

Herbert J. Robinson

It is certified that error appears in the above identified patent and that said Letters Patent are hereby corrected as shown below:

Column 1, lines 52 and 53, cancel "preferred. However, the hydrous forms are liberal amounts." and insert -- not toxic and therefore can be used in liberal amounts. --. Columns 3 and 4, lines 18 to 25, the equation should appear as shown below:

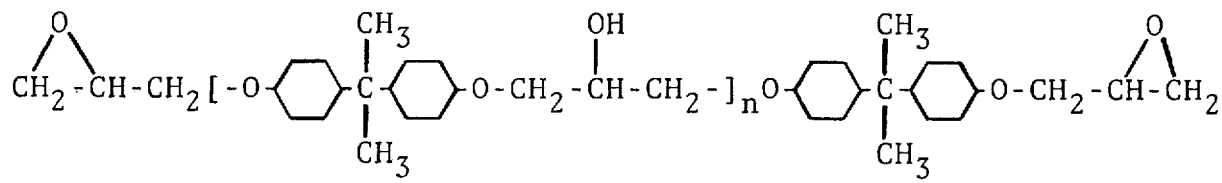

Column 5, line 30, cancel "Iron oxide --------- 94    89", second occurrence. Column 8, line 17, "2,978,434" should read -- 2,978,424 --.

Signed and sealed this 2nd day of December 1969.

(SEAL)
Attest:

EDWARD M. FLETCHER, JR.                   WILLIAM E. SCHUYLER, JR.
Attesting Officer                                 Commissioner of Patents